United States Patent
Fuller et al.

(10) Patent No.: US 7,851,551 B2
(45) Date of Patent: Dec. 14, 2010

(54) POLYMER PROCESSES

(75) Inventors: Timothy J. Fuller, Pittsford, NY (US); Damodar M. Pai, Fairport, NY (US); John F. Yanus, Webster, NY (US); Markus R. Silvestri, Fairport, NY (US); Kenny-Tuan T Dinh, Webster, NY (US); Yuhua Tong, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 966 days.

(21) Appl. No.: 10/808,679

(22) Filed: Mar. 25, 2004

(65) Prior Publication Data

US 2005/0250027 A1 Nov. 10, 2005

(51) Int. Cl.
*C08G 63/48* (2006.01)
*G03F 7/00* (2006.01)

(52) U.S. Cl. .................. 525/56; 525/62; 430/270.1

(58) Field of Classification Search ............. 430/270.1, 430/64, 65; 525/56, 62
See application file for complete search history.

(56) References Cited

U.S. PATENT DOCUMENTS

| | | | |
|---|---|---|---|
| 2,581,832 A | 1/1952 | Blume | |
| 2,642,419 A * | 6/1953 | Waugh et al. | 525/62 |
| 3,879,328 A * | 4/1975 | Jones | 524/389 |
| 4,311,805 A * | 1/1982 | Moritani et al. | 525/60 |
| 4,384,095 A | 5/1983 | Reed et al. | 526/293 |
| 4,542,165 A * | 9/1985 | Kumata et al. | 521/137 |
| 5,200,464 A * | 4/1993 | Furuno et al. | 525/59 |
| 5,349,008 A * | 9/1994 | Takada et al. | 524/557 |
| 5,710,211 A * | 1/1998 | Sato et al. | 525/62 |
| 5,811,488 A * | 9/1998 | Narumoto et al. | 525/56 |
| 6,200,716 B1 * | 3/2001 | Fuller et al. | 430/64 |
| 6,251,313 B1 * | 6/2001 | Deubzer et al. | 264/4.1 |
| 6,287,373 B1 | 9/2001 | Malhotra et al. | 106/31.29 |
| 6,326,521 B2 | 12/2001 | Van Soolingen et al. | 568/715 |
| 6,391,992 B1 * | 5/2002 | Pinschmidt et al. | 526/240 |

FOREIGN PATENT DOCUMENTS

| | | |
|---|---|---|
| EP | 0 007 791 A | 2/1980 |
| EP | 0 630 912 A | 12/1994 |
| GB | 631 590 A | 11/1949 |
| GB | 1 102 771 A | 2/1968 |

OTHER PUBLICATIONS

Beihoffer T.W., Glass J.E.; *Journal of Polymer Science: Part A: Polymer Chemistry*, 1988, 26, 343-353.

* cited by examiner

*Primary Examiner*—Amanda C. Walke
(74) *Attorney, Agent, or Firm*—Fay Sharpe LLP

(57) ABSTRACT

Disclosed is a process for the preparation of poly(vinylbenzyl alcohol) by, for example the hydrolysis of poly(vinylbenzyl acetate) in the presence of a basic catalyst in an organic solvent.

26 Claims, 1 Drawing Sheet

POLYMER PROCESSES

FIELD OF THE INVENTION

The present invention relates to a process for the preparation of polymeric alcohols, such as poly(vinylbenzyl alcohol) via for example the alkaline hydrolysis of poly(vinylbenzyl acetate).

BACKGROUND OF THE INVENTION

Poly(vinylbenzyl alcohol) can be used in several applications, for example as an adhesive in bonding non-adhering layers, in photoresist formulations and as an undercoat layer in imaging members.

Several attempts have been made to synthesize poly(vinylbenzyl alcohol). One synthesis method is described in U.S. Pat. No. 3,879,328. According to the method, poly(vinylbenzyl alcohol) is formed by the polymerization of vinylbenzyl alcohol which is prepared from the hydrolysis of vinylbenzyl chloride. One drawback of the method may be that the overall yield is low at about 5%, due primarily to the low yield of formation of vinyl benzyl alcohol from vinyl benzyl chloride. Other disadvantages may include the difficulty in separating vinylbenzyl chloride as a starting material from vinylbenzyl alcohol and vinylbenzyl ether, and the formation of residual divinylbenzyl ether which may lead to the crosslinking of poly(vinylbenzyl alcohol) and gel formation.

According to the method of U.S. Pat. No. 6,200,716, poly (vinylbenzyl alcohol) and poly(vinylbenzyl alcohol-vinylbenzyl acetate) can be formed by the borane reduction of poly(vinylbenzyl acetate) which itself was formed by the reaction of poly(vinylbenzyl chloride) with sodium acetate. Poly(vinylbenzyl acetate) is hydrolyzed or reduced to form poly(vinylbenzyl alcohol). Partial reduction of the acetate produces copolymers of the poly(vinylbenzyl alcohol-vinylbenzyl acetate). Although borane reduction affords control of macromolecular structure, a drawback of the method may be that the yield is low. Another drawback is that borane is difficult to handle, and the process is expensive and difficult to scale up.

It is therefore desirable to provide a process for the preparation of poly(vinylbenzyl alcohol) using readily available reagents which may not require any special handling. Furthermore, it is desirable to provide a process for the preparation of poly(vinylbenzyl alcohol) in high purity of at least about 90%. The process is amenable to scale-up without the production of environmentally harmful by-products.

SUMMARY OF THE INVENTION

Aspects disclosed herein include a process comprising hydrolyzing poly(vinylbenzyl acetate) in the presence of a basic catalyst. In one aspect, the process comprising converting poly(vinylbenzyl chloride) to poly(vinylbenzyl acetate) and hydrolyzing the poly(vinylbenzyl acetate) in the presence of a basic catalyst. In one aspect, the hydrolysis is conducted in an organic solvent. In one aspect the organic solvent is a pyridine. In another aspect the organic solvent is tetrahydrofuran. The molar ratio of organic solvent to poly(vinylbenzyl actetate) is from about 100:1 to about 4:1, the hydrolysis temperature of from about 40° C. to about 100° C. and the hydrolysis reaction time is from about 1 hour to about 6 hours.

In one aspect, the basic catalyst can be a quaternary ammonium salt. The quaternary ammonium salt can be a tetraalkylammonium hydroxide. In another aspect, the tetraalkylammonium hydroxide is tetrabutylammonium hydroxide. The quaternary ammonium salt can also be an aralkyltrialkylammonium hydroxide. In another aspect, the aralkyltrialkylammonium hydroxide is benzyltrimethylammonium hydroxide. Yet in another aspect, the basic catalyst can also be a metal alkoxide. The metal alkoxide is sodium methoxide.

In one aspect, the process comprises cooling the reaction mixture comprising the hydrolyzed poly(vinylbenzyl acetate) to a temperature of from about 10° C. to about 30° C., adding water to precipitate the poly(vinylbenzyl alcohol) and recovering the poly(vinylbenzyl alcohol).

In one aspect, an imaging member containing a charge blocking layer comprising poly(vinylbenzyl alcohol) generated by the process of the invention.

The present invention provides for a process for the preparation of poly(vinylbenzyl alcohol) using readily available reagents which in embodiments do not require any special handling. The process is amenable to scale-up without the production of environmentally harmful by-products.

The preparation of poly(vinylbenzyl alcohol) is accomplished by the hydrolysis of poly(vinylbenzyl acetate) in the presence of a basic catalyst. The hydrolysis is conducted in an organic solvent in which the poly(vinylbenzyl acetate), the basic catalyst and the poly(vinylbenzyl alcohol) are soluble. In one embodiment, the poly(vinylbenzyl acetate) is obtained from the conversion of poly(vinylbenzyl chloride). A specific organic solvent is tetrahydrofuran. The molar ratio of the organic solvent to the poly(vinylbenzyl acetate) is from about 100:1 to about 4:1. The hydrolysis reaction is accomplished at a temperature from about 40° C. to about 100° C., and the hydrolysis reaction time is from about 1 hour to about 6 hours.

The basic catalyst can be any catalyst. Examples of a basic catalyst include quaternary ammonium salts such as tetraalkylammonium hydroxide, wherein optionally the alkyl is linear or branched and with from about 1 to about 20 carbon atoms, and aralkyltrialkylammonium hydroxide, wherein optionally the aralkyl is a benzyl group and the alkyl is linear or branched with from about 1 to about 20 carbon atoms. Examples of a basic catalyst also include a metal alkoxide, wherein optionally the metal is an alkali and the alkyl group of the alkoxide is linear or branched and with from about 1 to about 20 carbon atoms. A specific tetraalkylammonium hydroxide is tetrabutylammonium hydroxide, a specific aralkyltrialkylammonium hydroxide is benzyltrimethylammonium hydroxide, and a specific metal alkoxide is sodium methoxide. The basic catalyst can be added at any moment, preferably at the beginning of the hydrolysis reaction. The amount of basis catalyst is not particularly critical, and can be controlled alongside the reaction conditions so that a homogeneous phase is obtained at the end of the hydrolysis reaction.

Following alkaline hydrolysis, poly(vinylbenzyl alcohol) can be recovered by cooling the mixture containing the poly (vinylbenzyl alcohol) to a temperature form about 10° C. to about 30° C. and adding water to precipitate and recover the poly(vinylbenzyl alcohol). The recovered poly(vinylbenzyl alcohol) has a glass transition temperature ($T_g$) of from about 110° C. to about 160° C., preferably from about 120° C. to about 140° C. depending on the extent of conversion of the acetate. The overall yield is greater than about 90%.

The poly(vinylbenzyl alcohol) of the invention can be incorporated into the charge blocking layer of an imaging member. For the imaging members containing the poly(vinylbenzyl alcohol) of the invention, cycle-up and charge entrapment are minimal due to the presence of poly(vinylbenzyl alcohol).

These and other features and advantages of the invention will be more readily apparent in view of the detailed description which follows.

BRIEF DESCRIPTION OF THE FIGURE

A more complete understanding of the process of the present invention can be obtained by reference to the accompanying FIGURE wherein.

Figure 1:
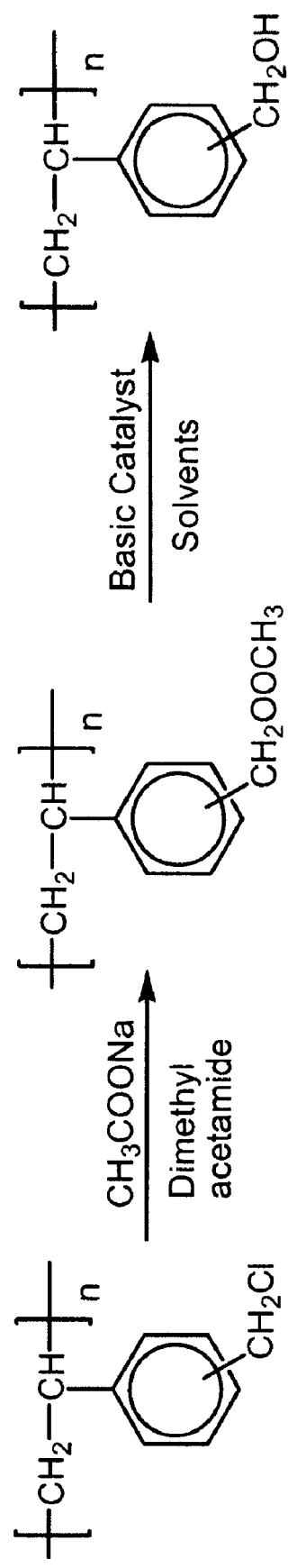
FIG. 1 shows the synthesis scheme of the present invention.

The FIGURE is referred to in greater detail in the following detailed description.

DETAILED DESCRIPTION OF THE PREFERRED EMBODIMENTS

This invention describes a process for the preparation of poly(vinylbenzyl alcohol) according to the scheme shown in FIG. 1. By the process of the invention, poly(vinylbenzyl alcohol) can be recovered with an overall yield of the process is greater than about 90%. The recovered poly(vinylbenzyl alcohol) has a glass transition temperature ($T_g$) of from about 110° C. to about 160° C., preferably from about 120° C. to about 140° C. depending on the extent of conversion of the acetate.

As shown in FIG. 1, a poly(vinylbenzyl ester) of an organic carboxylic such as poly(vinylbenzyl acetate) is hydrolyzed in the presence of a basic catalyst in an organic solvent. Prior to hydrolysis, poly(vinylbenzyl acetate) can be formed by the reaction of poly(vinylbenzyl chloride) with sodium acetate in a polar aprotic solvent such as N,N-dimethylacetamide, N,N-dimethylformamide, N-methylpyrolidinone, dimethylsulfoxide, and the like.

The basic catalyst useful in the process of the invention can be any catalyst which is able to solubilize in the organic solvent of the invention. Examples of a basic catalyst include quaternary ammonium salts such as tetraalkylammonium hydroxide, wherein optionally the alkyl is linear or branched and with from about 1 to about 20 carbon atoms, and aralkyltrialkylammonium hydroxide, wherein optionally the aralkyl is a benzyl group and the alkyl is linear or branched and with from about 1 to about 20 carbon atoms. Examples of a basic catalyst also include a metal alkoxide, wherein optionally the metal is an alkali and the alkyl group of the alkoxide is linear or branched and with from about 1 to about 20 carbon atoms. Examples of a tetraalkylammonium hydroxide include tetramethylammonium hydroxide, tetraethylammonium hydroxide, tetrapropylammonium hydroxide, tetrabutylammonium hydroxide, trimethylpropylammonium hydroxide and the like. A specific tetraalkylammonium hydroxide is tetrabutylammonium hydroxide. Examples of an aralkyltrialkylammonium hydroxide include benzyltrimethylammonium hydroxide, benzyltriethylammonium hydroide, benzyldimethylhexadecylammonium hydroxide, benzylacetyldimethylammonium hydroxide and the like. A specific aralkyltrialkylammonium hydroxide is benzyltrimethylammonium hydroxide. Examples of a metal alkoxide include sodium methoxide, sodium ethoxide, potassium methoxide, potassium tert-butoxide and the like. A specific metal alkoxide is sodium methoxide.

The amount of basic catalyst is not particularly critical. A person skilled in the art will be able to determine the optimum amount of the basic catalyst to be added in a simple manner on the basis of the desired reaction rate, the homogeneity of the system and the desired degree of conversion. The basic catalyst can be added at any moment, preferably at the beginning of the hydrolysis reaction, and the amount of basic catalyst used and the chosen reaction conditions can be controlled so that a homogeneous phase is obtained at the end of the hydrolysis.

By the process of the invention, the hydrolysis is conducted in an organic solvent. The choice of organic solvent is determined by the ability of the poly(vinylbenzyl acetate), the basic catalyst and the poly(vinylbenzyl alcohol) to solubilize in the organic solvent. Examples of such organic solvent include a pyridine or tetrahydrofuran. A specific organic solvent is tetrahydrofuran.

The hydrolysis of poly(vinylbenzyl acetate) proceeds according to an equilibrium reaction, and the hydrolysis reaction can be performed with a high degree of conversion of the poly(vinylbenzyl acetate), for example, a degree of conversion of more than about 85%, preferably more than about 95%. By using an optimal ratio of reactants or the removal of reaction products, a process stream can be obtained from which very pure poly(vinylbenzyl alcohol) can be recovered in a simple manner. Thus, it is possible to precisely control and tailor the number of alcohol groups in the poly(vinylbenzyl alcohol) and any poly(vinylbenzyl alcohol-vinylbenzyl acetate) copolymer formed. Polymers produced with more than about 77 mole % benzyl alcohol groups are soluble in methanol, ethanol, propanol and 1-methoxy-2-propanol. Polymers produced with less than about 77 mole % benzyl alcohol groups are soluble in tetrahydrofuran and alcohol-tetrahydrofuran mixtures. All polymers are insoluble in water. Poly(vinylbenzyl alcohol) which is insoluble in methylene chloride and tetrahydrofuran can be solubilized in these solvents by the addition or a small amount of alcohol. The weight average molecular weights (Mws) of the polymer and copolymer are between about 30,000 and about 50,000.

For a conversion rate of more than about 85%, preferably more than about 95%, the total hydrolysis time is from about 1 to about 6 hours, preferably from about 2 to about 3 hours. For an optimum rate of hydrolysis, the molar ratio of solvent to poly(vinylbenzyl acetate) can vary of from about 100:1 to about 4:1, preferably of from about 20:1 to about 8:1. The temperature and pressure at which the alkaline hydrolysis reaction takes place may also vary within a wide range. The temperature may for example vary of from about 40° C. to about 100° C., preferably of from about 60° C. to about 70° C. Following hydrolysis, the reaction mixture can be cooled to a temperature of from about 10° C. to about 30° C., preferably of from about 18° C. to about 22° C., for example by means of an external heat exchanger. Poly(vinylbenzyl alcohol) can be recovered from the reaction mixture by the addition of water to precipitate the poly(vinylbenzyl alcohol). Standard washing followed by drying yields usable polymer. The recovered poly(vinylbenzyl alcohol) has a glass transition temperature ($T_g$) of from about 110° C. to about 160° C., preferably from about 120° C. to about 140° C. depending on the extent of conversion of the acetate. The overall yield of the process is greater than about 90%.

The process of the invention is amenable to scale-up and can be carried out in different types of reactors. Such reactors include a batch reactor, a plug-flow reactor, a continuously stirred tank reactor or combinations of different reactors. The residence time in the reactor depends strongly on the type of reactor, the temperature and the pressure, the miscibility and degree of mixing of the system, the organic solvent/poly(vinylbenzyl acetate) molar ratio and the composition of the feed. The residence time in the reactor may vary within a wide range, depending on the parameters chosen. A person skilled in the art will be able to determine the optimum residence time on the basis of the desired degree of conversion of poly(vinylbenzyl acetate) and the selectivity to the poly(vinylbenzyl alcohol). For example, at the manufacturing level, accommodating a reaction time to an eight-hour plant shift is often desirable. If the reaction mixture is too dilute, the reactants will react more slowly, hence the rate of reaction will decrease. Similarly, under equal reaction conditions, higher temperatures will typically increase the reaction rate, while lower temperatures decrease the reaction rate. Furthermore, highly dilute polymer solutions require larger quantities of non-solvents necessary for efficient precipitation and recovery of the desired products. The molar ratio of solvent to poly(vinylbenzyl acetate) can be of from about 100:1 to about 4:1, preferably of from about 20:1 to about 8:1, which allows the reaction to proceed to completion in about 2 to about 3 hours at a reflux temperature of from about 65° C. to about 70° C. More concentrated solutions can lead to highly viscous, difficult to air solutions with the possibility of poor heat transfer within the reactor. Moreover, concentrated mixtures can lead to re-precipitation being less efficient with the resulting impurities becoming entrained in the finished product.

The poly(vinylbenzyl alcohol) of the invention with or without poly(vinylbenzyl alcohol-vinylbenzyl acetate) can be incorporated in the charge blocking layer of an imaging member such as a photoreceptor. A representative photoreceptor includes an anti-curl layer, a supporting substrate, an electrically conductive ground plane, a charge blocking layer, an adhesive layer, a charge generating layer, a charge transport layer, an overcoating layer, and a ground strip. A detailed description of the photoreceptor and its elements is provided in U.S. Pat. No. 6,200,716 which is incorporated herein by reference in its entirety and made a part of this patent application. The methods set forth in U.S. Pat. No. 6,200,716 which are incorporated herein by reference were used to manufacture the photoreceptors and evaluate their performance. The results indicate that the benzyl alcohol containing polymers of the invention are excellent undercoat layers for photoreceptors.

A number of examples set forth below are illustrative of the different compositions and conditions that can be utilized in practicing the invention. It will be apparent, however, that the invention can be practiced with many types of compositions and processes and can have many different uses in accordance with the disclosure above and as pointed out hereinafter.

Materials

Poly(vinylbenzyl chloride) was obtained from Aldrich Chemical Co. or Scientific Polymer Products, Ontario, N.Y., with a weight average molecular weight (Mw) of approximately 50,000. Because the polymer is typically prepared by the free radical polymerization of vinylbenzyl chloride, the polydispersity (the ratio of the weight average molecular weight to the number average molecular weight) is generally between 3 and 6.

Sodium acetate and anhydrous N,N-dimethylacetamide were obtained from Aldrich Chemical Co. Methanol and methylene chloride were obtained from Fisher Scientific. Benzyltrimethylammonium hydroxide (40% solution) was obtained from Aldrich Chemical Co.

Example 1

Preparation of Poly(Vinylbenzyl Acetate)

Poly(vinylbenzyl chloride) (200 grams) and 200 grams of sodium acetate in 4 liters of in N,N-dimethylacetamide were heated in a 5-liter, 3-neck flask under argon equipped with a mechanical stirrer, reflux condenser, argon inlet and stopper for 24 hours, using a silicone oil bath at 90° C. The resultant solution was decanted and separated from the salts that crystallized on cooling and was added to water at a ratio of 25 ml of polymer solution for every 1 liter of water using a Waring blender that was speed controlled with a variable transformer (Variac). The precipitated polymer was collected by filtration, washed with water and then with methanol (2 gallons). The aggregated lump that formed was vacuum dried to yield poly(vinylbenzyl acetate) with a glass transition temperature (Tg) of about 38° C. The lump was broken with a hammer and pulverized to a fine powder with a Waring blender. Although the conversion of chloromethyl groups to acetyl methyl groups was 100% as determined using proton NMR spectrometry, the recovered yield of poly(vinylbenzyl acetate) was about 50% from poly(vinylbenzyl chloride).

Example 2

Preparation of Poly(Vinylbenzyl Alcohol)

Poly(vinylbenzyl acetate) (10 g) in anhydrous tetrahydrofuran (Aldrich, 100 grams) was stirred in a 500 ml, 3-neck round-bottom flask. The reaction vessel was equipped with a mechanical stirrer, reflux condenser and argon inlet and was situated in a silicone oil bath. The solution was heated at reflux until a solution is effectuated. Heating and reflux begin before addition of the organic base as provided below and continue until the polymer was completely dissolved. Benzyltrimethylammonium hydroxide (5 ml at 40 wt % in methanol) was then added. On addition of the base, the polymer precipitated. Water (5 ml) was added and there was no change of the appearance of the precipitate. Methanol (50 ml) was added to the mixture and the precipitate immediately dissolved. After 2.5 hours at reflux with stirring, the reaction mixture was added to water at a ratio of 25 ml of polymer solution for every 1 liter of water using a Waring blender controlled with a variable transformer (Variac). The precipitated white polymer was collected by filtration, washed with water and then vacuum dried. The polymer was then washed with methylene chloride or was reprecipitated into methylene chloride and was vacuum dried. The conversion of benzyl acetate groups to benzyl alcohol groups was quantitative as determined by proton NMR spectrometry. The recovered yield of poly(vinylbenzyl alcohol) with a glass temperature (Tg) of about 136° C. was about 7.0 grams (94% on a weight basis with poly(vinylbenzyl acetate).

Example 3

Scale-Up of the Preparation of Poly(Vinylbenzyl Alcohol)

Poly(vinylbenzyl acetate) (1520 grams or 8.64 moles) and tetrahydrofuran (10 kg) were placed in a 22 liters, 3-necked round-bottom flask equipped with a mechanical stirrer, an addition funnel (1 liter), and an inert gas inlet. The mixture was heated to reflux for 15 min and 750 grams of 5% sodium methoxide in methanol was added over a period of 10 minutes. To redissolve the precipitated polymer, 2000 grams of methanol were added to the flask and refluxed for an additional 3 hours. The solution was precipitated into 10× excess deionized water, washed 3 times with additional water and dried at about 50° C. under vacuum for about 48 hours. The polymer was then washed with methylene chloride and dried.

The yield was 1138 grams of an off-white powder (about 98% of a weight basis with poly(vinylbenzyl acetate).

Example 4

Control Photoreceptor

A control photoreceptor device was made with hydrolyzed gamma-aminopropyltriethoxysilane (γ-APS) as the undercoat layer in accordance with U.S. Pat. No. 4,464,450. γ-APS (1.0 gram, obtained from Aldrich Chemical Co.) was added into deionized water (4.0 grams) with magnetic stirring for 4 hours. Glacial acetic acid (0.3 grams) was added. After stirring for 10 minutes, the solution was mixed with ethanol (74.7 grams) and heptane (20.0 grams) to form a coating solution which was applied to a titanium-metallized Mylar substrate using a 0.5 mil Bird applicator bar. The resulting coating was dried for 3 minutes at 135° C. to form the undercoat layer. To the undercoat layer, a 0.5 weight percent solution of 49,000 polyester adhesive in methylene chloride was applied with a 0.5 mil Bird applicator. The coated film was then dried for 3 minutes at 140° C. to form the adhesive layer. To the adhesive layer, a dispersion of hydroxygallium phtalocyanine (1.33 grams) in toluene (37.5 grams) with a binder consisting of polyvinylpyridine-block-polystyrene (1.5 grams) was applied using a 0.5 mil Bird applicator. The coated film was then dried for 5 minutes at about 135° C. to form the charge generation layer. A coating of m-TBD (1.2 g) and Makroton polycarbonate (1.2 g) in 13.45 g of methylene chloride was then applied using a 4 mil Bird applicator. The resultant film was damp dried from about 40° C. to about 100° C. over 30 minutes to form the charge transport layer. The resultant dried charge transport layer had a thickness of about 25 μm.

The control photoreceptor device was analyzed using an electrical scanner for 50,000 cycles of charge, expose and erase. The initial charging potential was $V_0$=798 volts. The dark decay was $V_{dd/sec}$=98 volts per second. The initial slope of the photo-induced discharge curve (PIDC) was S=309 ergs./(volts.cm$^2$). The surface residual potential after erase was $V_r$=20 volts. The depletion voltage (from the charging characteristics) was $V_{depl}$=26 volts. The rise in surface residual potential after 10,000 cycles was $V_{cycle-up}$=0 volts.

Example 5

Photoreceptors with Poly(Vinylbenzyl Alcohol)

Poly(vinylbenzyl alcohol) (1 g) and titanium dioxide (1 g) in 14 g of ethyl alcohol were mixed with 30 g of steel shot on a paint shaker for 24 hours. The resultant dispersion was applied to a titanium-metallized Mylar substrate using a 0.5 mil Bird applicator bar. The resulting coating was dried for 3 min at about 140° C. to form a 2 μm thick undercoat layer. An adhesive layer, a charge generation layer and a charge transport layer were formed consequently as in Example 4. The photoreceptor device of this Example was analyzed using a motionless scanner for 50,000 cycles of charge, expose and erase. The initial charging potential $V_0$=802 volts. The dark decay was $V_{dd/sec}$=129.5 in volts per second. The initial slope of the photo-induced discharge curve (PIDC) was S=286 in ergs./(volts.cm$^2$). The surface residual potential after erase was $V_r$=19.3 volts. The depletion voltage (from the charging characteristics) was $V_{depl}$=34.5 volts. The rise in surface residual potential after 10,000 cycles was $V_{cycle-up}$=6.5 volts.

Example 6

Photoreceptors with Poly(Vinylbenzyl Alcohol) and Poly(Vinylbenzyl Alcohol-Vinylbenzyl Acetate)

Copolymers (1.0 gram) of poly(vinylbenzyl alcohol) and poly(vinylbenzyl alcohol-vinylbenzyl acetate) with 85 mol percent of benzyl alcohol groups were dissolved into a mixture of tetrahydrofuran (2.0 grams) and ethanol (7.0 grams). The resultant solution was applied to a titanium-metallized Mylar substrate using a 0.5 mil gap Bird applicator bar. The resultant coating was dried for 8 min at about 140° C. to form a 2 μm thick undercoat layer. An adhesive layer, a charge generation layer and a charge transport layer were formed as in Example 4. The photoreceptor device of this Example was analyzed using an electrical scanner for 50,000 cycles of charge, expose and erase. The initial charging potential was $V_0$=799 volts. The dark decay was $V_{dd/sec}$=116 volts per second. The initial slope of the photo-induced discharge curve (PIDC) was S=268 in ergs/(volts.cm$^2$). The surface residual potential after erase was $V_r$=33 volts. The depletion voltage (from the charging characteristics) was $V_{depl}$=2.5 volts. The rise in surface residual potential after 10,000 cycles was $V_{cycle-up}$=0.8 volts.

Table 1 shows that although the undercoat layer thickness of Example 4 is thinner than the undercoat layer thickness of Examples 5 and 6, the residual voltage is substantially of the same magnitude. In Examples 5 and 6, cycle-up and charge entrapment are minimal due to the presence of poly(vinylbenzyl alcohol).

TABLE 1

| Sample | Thickness of Undercoat Layer | Residual Voltage | Cycle-up 10,000 cycles |
|---|---|---|---|
| Example 4 | 0.05 microns | 0 volts | 0 volts |
| Example 5 | 2.0 microns | 19.3 volts | 6.5 volts |
| Example 6 | 2.0 microns | 33 volts | 0.8 volt |

Although the invention has been described with reference to specific preferred embodiments, it is not intended to be limited thereto. Those skilled in the art will recognize that variations and modifications may be made therein which are within the spirit of the invention and within the scope of the claims.

We claim:

1. A process for preparing poly(vinylbenzyl alcohol) comprising:
    preparing a reaction mixture comprising poly(vinylbenzyl acetate), a basic catalyst, and pyridine; and
    hydrolyzing the poly(vinylbenzyl acetate) in the presence of the basic catalyst to form poly(vinylbenzyl alcohol).

2. The process of claim 1, wherein the molar ratio of pyridine to poly(vinylbenzyl acetate) is from about 100:1 to about 4:1.

3. The process of claim 1, wherein the hydrolysis is conducted at a temperature of from about 40° C. to about 100° C.

4. The process of claim 1, wherein the hydrolysis reaction time is from about 1 hour to about 6 hours.

5. The process of claim 1, wherein the basic catalyst is a quaternary ammonium salt.

6. The process of claim 5, wherein the quaternary ammonium salt is a tetraalkylammonium hydroxide, wherein optionally the alkyl is linear or branched with from 1 to about 20 carbon atoms.

7. The process of claim 6, wherein the tetraalkylammonium hydroxide is tetrabutylammonium hydroxide.

8. The process of claim 5, wherein the quaternary ammonium salt is an aralkyltrialkylammonium hydroxide, wherein optionally the aralkyl is a benzyl and the alkyl is linear or branched with from 1 to about 20 carbon atoms.

9. The process of claim 8, wherein the aralkyltrialkylammonium hydroxide is benzyltrimethylammonium hydroxide.

10. The process of claim 1, wherein the basic catalyst is a metal alkoxide, wherein optionally the metal is an alkali and the alkyl group is linear or branched with from 1 to about 20 carbon atoms.

11. The process of claim 10, wherein the metal alkoxide is sodium methoxide.

12. The process of claim 1, further comprising cooling the reaction mixture comprising the hydrolyzed poly(vinylbenzyl acetate) to a temperature of from about 10° C. to about 30° C., adding water to precipitate the poly(vinylbenzyl alcohol) and recovering the poly(vinylbenzyl alcohol).

13. A process for preparing poly(vinylbenzyl alcohol) from poly(vinylbenzyl chloride), comprising:
    converting poly(vinylbenzyl chloride) to poly(vinylbenzyl acetate);
    preparing a reaction mixture comprising poly(vinylbenzyl acetate), a basic catalyst, and pyridine;
    and hydrolyzing the poly(vinylbenzyl acetate) in the presence of the basic catalyst to form poly(vinylbenzyl alcohol).

14. The process of claim 13, wherein the molar ratio of pyridine to the poly(vinylbenzyl acetate) is from about 100:1 to about 4:1.

15. The process of claim 13, wherein the hydrolysis is conducted at a temperature of from about 40° C. to about 100° C.

16. The process of claim 13, wherein the hydrolysis reaction time is from about 1 hour to about 6 hours.

17. The process of claim 13, wherein the basic catalyst is a quaternary ammonium salt.

18. The process of claim 17, wherein the quaternary ammonium salt is a tetraalkylammonium hydroxide, wherein optionally the alkyl is linear or branched with from 1 to about 20 carbon atoms.

19. The process of claim 18, wherein the tetraalkylammonium hydroxide is tetrabutylammonium hydroxide.

20. The process of claim 17, wherein the quaternary ammonium salt is an aralkyltrialkylammonium hydroxide, wherein optionally the aralkyl is a benzyl and the alkyl is linear or branched with from about 1 to about 20 carbon atoms.

21. The process of claim 20, wherein the aralkyltrialkylammonium hydroxide is benzyltrimethylammonium hydroxide.

22. The process of claim 13, wherein the basic catalyst is a metal alkoxide, wherein optionally the metal is an alkali and the alkyl group is linear or branched with from 1 to about 20 carbon atoms.

23. The process of claim 22, wherein the metal alkoxide is sodium methoxide.

24. The process of claim 13, further comprising cooling the reaction mixture comprising the hydrolyzed poly(vinylbenzyl acetate) to a temperature from about 10° C. to about 30° C., adding water to precipitate the poly(vinylbenzyl alcohol) and recovering the poly(vinylbenzyl alcohol).

25. Poly(vinylbenzyl alcohol) made by the process of claim 1.

26. An imaging member containing a charge blocking layer comprising poly(vinylbenzyl alcohol) generated by the process of claim 1.

* * * * *